UNITED STATES PATENT OFFICE.

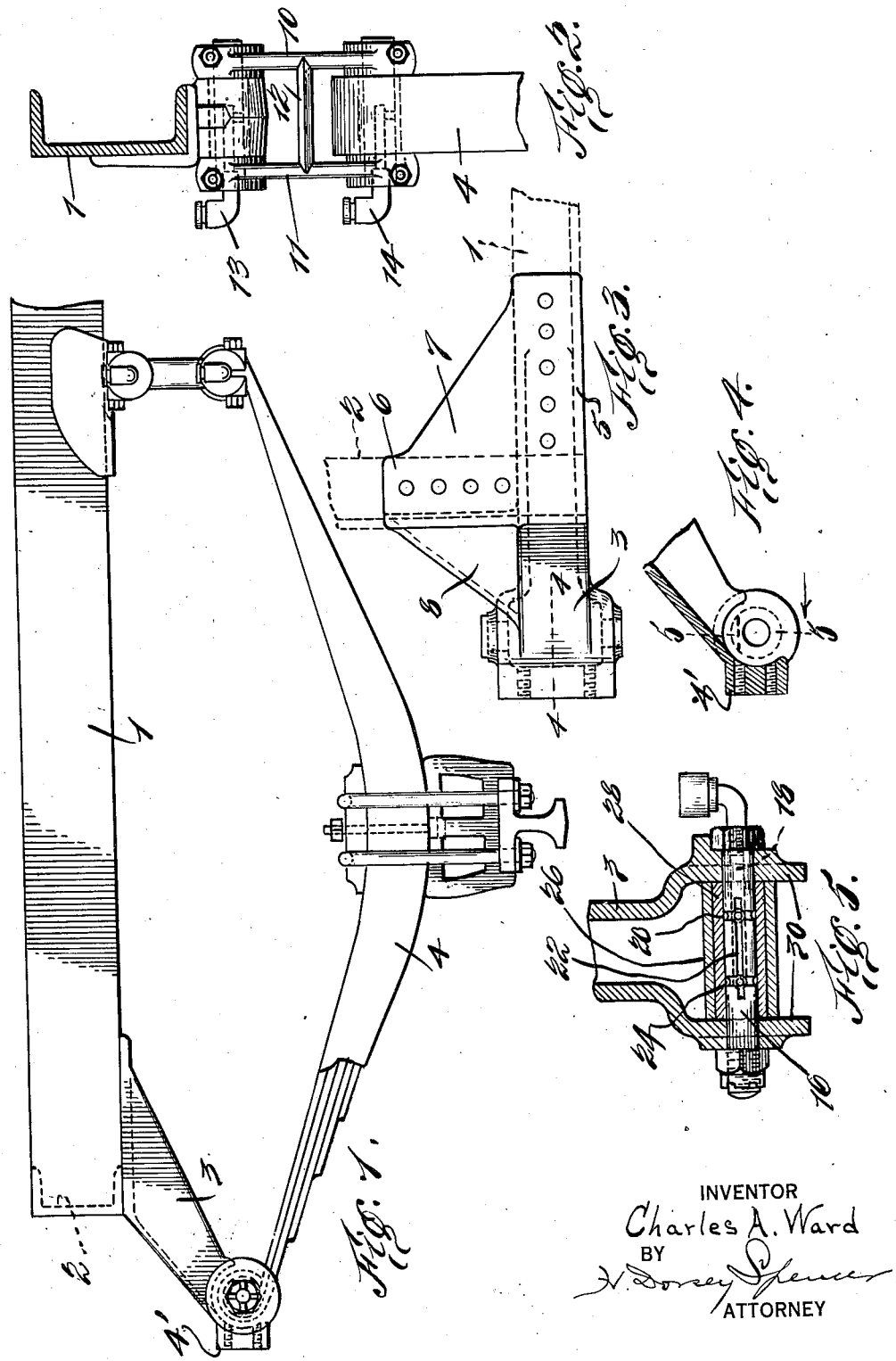

CHARLES A. WARD, OF MOUNT VERNON, NEW YORK.

MOTOR-VEHICLE CHASSIS.

1,377,234.

Specification of Letters Patent.   Patented May 10, 1921.

Application filed April 3, 1919.   Serial No. 287,163.

*To all whom it may concern:*

Be it known that I, CHARLES A. WARD, a citizen of the United States, residing at Mount Vernon, county of Westchester, State of New York, have invented certain new and useful Improvements in Motor-Vehicle Chassis, of which the following is a clear, full, and exact description.

This invention relates to motor vehicle chassis, and particularly to improvements in frame and spring support construction of motor vehicles.

A general object of the invention is to improve the frame construction of that type of motor vehicle chassis which is provided with a spring supporting gooseneck at one end of the vehicle frame to the end that both a stronger vehicle frame construction may be provided, and, at the same time, a more effective support for the spring may be obtained.

More particularly the invention aims to provide, in a single integral structure, a combined frame corner brace, a spring supporting gooseneck, and a bumper support, all of which is so constructed that it not only serves as an effective brace to maintain the rectangular or other predetermined shape of the frame, but that it also, by its attachment to the frame, provides an effective support against both the vertical and the lateral strains transmitted through the springs. As a further feature of the integral structure there is also provided an anchorage for a cross member, preferably a channel, used as a bumper to protect the vehicle.

Other objects and important features of the invention will appear from the following description and claims when taken in connection with the accompanying drawings, in which—

Figure 1 is a side elevation,

Fig. 2, an end elevation looking from its right in Fig. 1;

Fig. 3, a broken top plan view;

Fig. 4, a section through the line 4—4, Fig. 3, and

Fig. 5, a section on the line 5—5, Fig. 4.

In order to brace this frame so that it will form a rigid structure in the region of the spring attachment and effectually resist shocks and strains transmitted to it by the spring, I provide a novel gooseneck construction 3 comprising the gooseneck proper, to one end of which is attached the spring 4, the end being also provided with a nib 4' for supporting a channel or other bumper member. The gooseneck forms one member of an integral bracket, said bracket having the portion 5 which is riveted or otherwise fastened to the side frame member 1, as shown in Fig. 2, and the portion 6 extending at right angles, or approximately at right angles, to the portion 5, and riveted or otherwise fastened to the end frame member 2. Web member 7 connects the two members 5 and 6 and web member 8 connects member 6 with the gooseneck. The gooseneck is forked, as shown in Fig. 5, and a spring supporting stud or pin 16 passes through the forks.

The other end of each spring is supported by a bracket rigidly fastened to the side frame member 1 by means of a shackle, having the shape of the letter H, as shown in Fig. 2. The side bars 10 and 11 of the H shaped shackle is supported for pivotal movement in the bracket carried by the side frame member. At their lower ends said side bars of the shackle carry means for supporting the spring. The cross-bar 12 of the shackle passes between the two supporting means and gives great rigidity to the shackle. Oil cups 13 and 14 are provided for furnishing lubrication to the shackle bearings which oil cups and their supporting pins both serve to lubricate not only the spring bushings but the spring leaves themselves, this being more fully described and claimed in a co-pending application of even date herewith.

The particular structure of this means for oiling the spring bearings and the springs is more fully described and shown in a co-pending application of even date herewith. This oiling means consists essentially of a spring bearing bolt or pin 16, having a central lubricant containing chamber 18 communicating with the outer surface of the bolt or pin through transverse openings 20. In order to conduct the lubricant lengthwise of the bearings, the pin upon its outer surface is preferably provided with longitudinal grooves or channels 22 and in order to insure effective oiling of the bearing, it is also preferably provided with peripheral grooves or channels 24. Between the bearing loop 26 of the spring and the bearing pin 16 there is preferably located a bushing 28 which extends to the ends or edges of the bearing loop and which closely fits the bearing pin 16. It will be understood that it is immaterial whether the grooves or channels 22 and 24 are on the outer surface of the pin or upon the inner surface of the bushing 28.

One of the principal purposes of the longitudinal grooves 22 in the bearing pin is to cause the lubricant to be conducted toward the ends of the bushing 28, from which, by capillary action between the ends of said bushing and the sides 30 of the bracket yoke and by gravity, the lubricant will be conducted down upon the sides of the spring leaf which carries the bushing loops 26 and will thus be carried between the leaves of the spring, the spring 4 being a spring of the usual leaf-spring type having the longer leaves uppermost. This action is caused not only by gravity and capillary action but also by suctional action as the spring leaves open slightly from rebound. Further distribution of the lubricant between the spring leaves takes place as they move over each other all as pointed out more fully in the co-pending application heretofore referred to, this arrangement being very effective in securing proper lubrication of the spring.

Having thus described my invention, what I desire to claim and secure by Letters Patent is:

1. An integral spring supporting gooseneck and frame corner brace for vehicle frames, comprising a triangular corner bracing web adapted to be located in the plane of the vehicle frame, a gooseneck extending from said bracing web and comprising a triangular gooseneck side forming and bracing web extending from one side of said first mentioned web in a plane normal thereto, and a third triangular gooseneck bracing web connecting another side of said first mentioned web with the other side of said gooseneck.

2. An integral spring supporting gooseneck and frame corner brace for vehicle frames, comprising a triangular corner bracing web adapted to be located in the plane of the vehicle frame, a gooseneck extending from said bracing web and comprising a triangular gooseneck side forming and bracing web extending from one side of said first-mentioned web in a plane normal thereto, and a third triangular gooseneck bracing web connecting another side of said first-mentioned web with the other side of said gooseneck, said gooseneck having a downwardly opening channel, and the junction sides of said last mentioned two webs being substantially co-extensive respectively with the sides of said first mentioned web and with the sides of said gooseneck.

3. An integral spring supporting gooseneck and frame corner brace for vehicle frames comprising a triangular corner bracing web or base adapted to be located in the plane of the vehicle frame, a second triangular gooseneck side-forming and bracing web extending from one side of said first-mentioned web in a plane normal thereto, and a third triangular gooseneck bracing web extending between said gooseneck and another side of said first-mentioned web in a plane oblique to one of said aforementioned two planes.

4. An integral spring supporting gooseneck and frame corner brace for vehicle frames comprising a triangular corner bracing web or base adapted to be located in the plane of the vehicle frame, a second triangular gooseneck side-forming and bracing web extending from one side of said first-mentioned web in a plane normal thereto, and a third triangular gooseneck bracing web extending between said gooseneck and another side of said first-mentioned web in a plane oblique to one of said aforementioned two planes, said gooseneck comprising a downwardly opening channel.

5. In a device of the character described, adapted to be connected to the side and end frame members of a vehicle chassis at the junction corner, an integral structure having a base portion shaped to be connected to each of said members and having a web extending across and forming a corner brace for said members, said structure comprising also an integral downwardly depending gooseneck portion forming an extension of one of said frame members, and having a side web portion substantially in the plane of the side of said member, and another side web portion forming a triangular brace with that part of the base portion connected to the other member, said gooseneck being shaped to support a spring bearing and having upon its front lower edge a boss for attachment of a vehicle bumper.

6. In a device of the character described, an integral spring and bumper supporting gooseneck structure for attachment of the forward corner of the vehicle chassis, comprising a base portion of substantially triangular shape adapted to be connected to the side and end frame members of the chassis and to form a brace across the corner of said frame, a second substantially triangular portion forming one side of said gooseneck, and a third substantially triangular portion forming the other side of said gooseneck and also forming a lateral brace for said gooseneck extending substantially to the end of that part of the base portion which is adapted to be connected to the end frame member.

Signed at Mount Vernon, N. Y., this 27th day of March, 1919.

CHARLES A. WARD.

Witness:
A. BOCKHORSH.